(No Model.)

T. DISSETT.
DELIVERY WAGON.

No. 334,759. Patented Jan. 26, 1886.

Attest:
C. B. Nash,
H. B. Knight.

Inventor:
Tho's Dissett,
By E. B. Whitmore,
Atty.

UNITED STATES PATENT OFFICE.

THOMAS DISSETT, OF ROCHESTER, NEW YORK.

DELIVERY-WAGON.

SPECIFICATION forming part of Letters Patent No. 334,759, dated January 26, 1886.

Application filed November 6, 1885. Serial No. 182,069. (No model.)

*To all whom it may concern:*

Be it known that I, THOMAS DISSETT, of Rochester, in the county of Monroe and State of New York, have invented a new and useful Improvement in Delivery-Wagons, which improvement is fully set forth in the following specification, and shown in the accompanying drawings.

The object of my invention is to produce a more convenient and compact light delivery-wagon for grocers' or merchants' use, and for other purposes, than heretofore known, the same being fully described hereinbelow, and more particularly pointed out in the claims.

Figure 3:
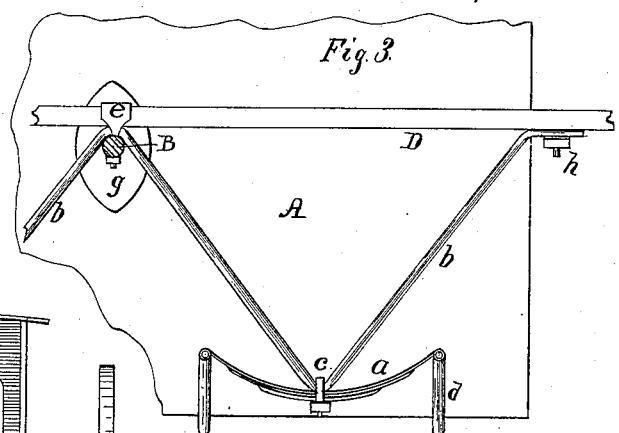
Figure 1:
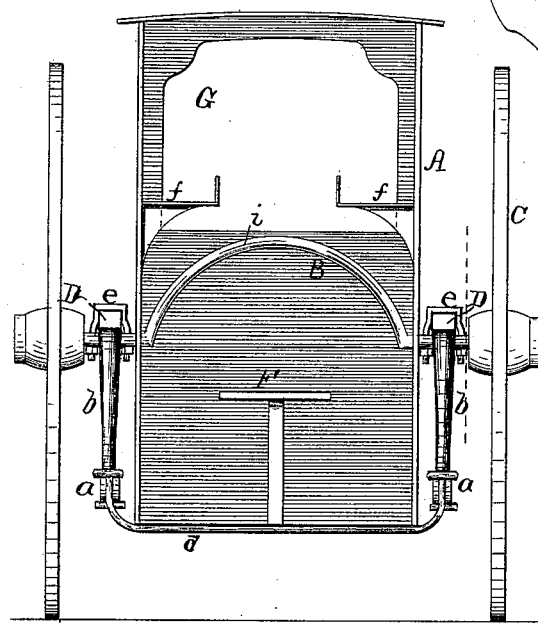
Figure 2:
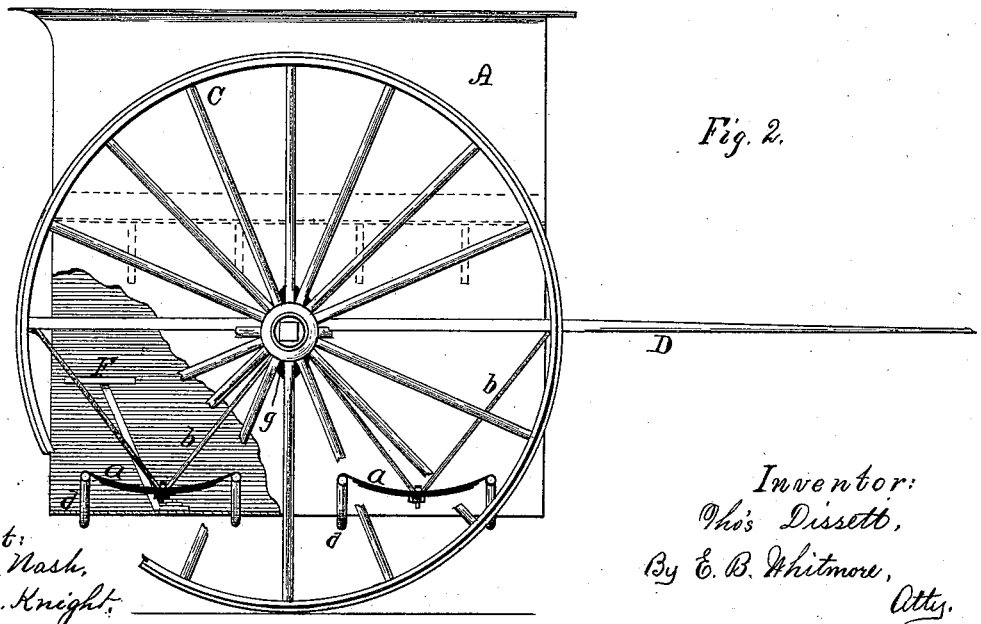

Referring to the drawings, Figure 1 is a rear elevation of my improved delivery-wagon, showing the interior of the body of the same, the form of the axle and the manner of hanging the body thereon; Fig. 2, a side elevation of the same, viewed in the direction indicated by arrow in Fig. 1, a part of the wheel and side of the body being broken away to better show the device; and Fig. 3, a portion of a side of the wagon, viewed in the same direction in which Fig. 2 is seen, drawn to a larger scale to better show the manner of supporting the body upon the axle, parts not essential to the figure being omitted.

Referring to the parts, A is the body of the cart or wagon; B, the axle; C, the wheels, and D the thills. *b* are the suspenders, and *d* the stirrups for holding the body.

The body of the wagon is designed to be made of sufficient height internally to admit of a man standing erect therein, and as wide as the body of an ordinary wagon, and in length, measured on the line of draft, about equal to the height, though any or all of these dimensions may be varied to suit circumstances. The body is formed with an opening, G, through the front wall thereof, for the convenience of the driver, who sits inside, and there may be also, if desirable, openings or windows formed in the sides of the body, out through which the driver may better see his surroundings. The wheels of the wagon I prefer to make two in number, they being of common kind, and secured to the ends of the axle in the usual manner. The axle I prefer to make with an upward vertical bow, *i*, within the body, as being more convenient in disposing of parcels and packages therein, the driver sitting upon a seat, F, in rear of said axle. The body rests upon four horizontal transverse stirrups, *d*, which are attached to the ends of longitudinal side openings, *a*, said springs being held or supported by suspenders *b*, attached to the axle on either side of the body. The suspenders are preferably made double-braced, or in the form of a W, with the springs secured at the lower points or angles thereof by clips *c*, of common kind. These suspenders at their upper angles at the middle of each pass over and rest upon the axle, which latter, with the suspenders and thill-bars, are firmly held together by suitable clips, *e*. At the upper extreme ends the suspenders are secured to the thills by ordinary carriage-bolts *h*. By this construction the body of the cart is hung very low and near the ground without having to resort to the use of a crank-axle, or one bent to hang near the ground, which form of axle is weak and otherwise objectionable. Having the body thus suspended low is a great convenience in loading and unloading parcels from and upon a sidewalk, as when the cart is backed up to the curbstone of the sidewalk, with the wheels resting in the gutter of the street, the floor of the cart is nearly at a level with the surface of said sidewalk. The body is suspended from the axle by the suspenders *b*, and rests easily in the cradle or support formed by the parallel stirrups *d*, joined to said springs and suspenders, as shown. The suspenders are made wide where they rest upon the axle, for the purpose of giving them a broad bearing thereon to prevent side swaying of the body. The thill-bars are also made wide where they cross the axle. Shelves or galleries *f* are formed along the inner walls of the body, upon which to receive lighter parcels, which galleries add to the capacity of the wagon as yielding additional floor-room. One or more galleries may be formed in the body along the sides and front, according to the uses to which the wagon is to be put. The side walls of the body where pierced by the axle are cut away, forming openings *g*, so as to allow a relative vertical motion of the body from the action of the springs, and a forward and back motion, resulting from the unevenness of draft.

What I claim as my invention is—

1. The body of a wagon, in combination with the wheels and axle thereof, said axle passing through the space within the body and formed with a vertical curve or bend, substantially as shown and described.

2. In combination with the body, thills, and axle of a wagon, rigid inclined suspenders $b$ for the body, secured rigidly to the thills and pendent therefrom, horizontal springs secured to the lower angles of said suspenders, and rests $d$ for said body, secured to said springs, substantially as shown and described.

THOS. DISSETT.

Witnesses:
E. B. WHITMORE,
H. B. KNIGHT.